(12) United States Patent
Bagepalli et al.

(10) Patent No.: US 8,434,996 B2
(45) Date of Patent: May 7, 2013

(54) SYSTEM AND METHOD FOR DETECTING AND/OR CONTROLLING LOADS IN A WIND TURBINE

(75) Inventors: Bharat Bagepalli, Niskayuna, NY (US); Nilesh Tralshawala, Rexford, NY (US); Aditi Koppikar, Bangalore (IN); Sascha Schieke, Greer, SC (US); Pekka Sipilae, Munich (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/312,305

(22) Filed: Dec. 6, 2011

(65) Prior Publication Data

US 2012/0134810 A1  May 31, 2012

(51) Int. Cl.
*F03D 7/02* (2006.01)

(52) U.S. Cl.
USPC ............. 415/14; 415/13; 415/118; 416/31; 416/43; 416/61

(58) Field of Classification Search ............ 415/13, 415/14, 118; 416/31, 43, 61
See application file for complete search history.

(56) References Cited

U.S. PATENT DOCUMENTS

| | | | |
|---|---|---|---|
| 5,760,731 A * | 6/1998 | Holmes | 342/118 |
| 6,361,275 B1 | 3/2002 | Wobben | |
| 6,619,918 B1 | 9/2003 | Redsdorf | |
| 6,940,186 B2 | 9/2005 | Weitkamp | |
| 7,004,724 B2 | 2/2006 | Pierce et al. | |
| 7,095,129 B2 * | 8/2006 | Moroz | 290/44 |
| 7,160,083 B2 * | 1/2007 | Pierce et al. | 416/61 |
| 7,293,959 B2 | 11/2007 | Pedersen et al. | |
| 7,351,033 B2 | 4/2008 | McNerney | |
| 7,631,564 B1 * | 12/2009 | Sihler et al. | 73/862.333 |
| 7,755,210 B2 | 7/2010 | Kammer et al. | |
| 7,909,575 B2 | 3/2011 | Barbu et al. | |
| 7,922,448 B2 | 4/2011 | Garrido et al. | |
| 2008/0118354 A1 | 5/2008 | Jeppesen et al. | |
| 2009/0129924 A1 | 5/2009 | Rebsdorf et al. | |
| 2009/0180875 A1 | 7/2009 | Egedal et al. | |
| 2009/0261588 A1 | 10/2009 | Von Mutius et al. | |
| 2010/0014970 A1 | 1/2010 | Bove et al. | |
| 2010/0052320 A1 | 3/2010 | Hoffmann | |
| 2010/0087960 A1 | 4/2010 | Hayashi et al. | |
| 2010/0133828 A1 * | 6/2010 | Stegemann et al. | 290/44 |
| 2011/0091321 A1 | 4/2011 | Baker et al. | |
| 2011/0217168 A1 | 9/2011 | Kristensen et al. | |
| 2012/0076652 A1 | 3/2012 | Ventzke et al. | |

FOREIGN PATENT DOCUMENTS

| | | |
|---|---|---|
| DE | 102007058054 | 6/2009 |
| GB | 2464961 | 5/2010 |
| WO | 2010071607 | 6/2010 |

OTHER PUBLICATIONS

Co-pending and commonly assigned U.S. Appl. No. 13/217,796, filed Aug. 25, 2011.
Co-pending and commonly assigned U.S. Appl. No. 12/970,078, filed Dec. 16, 2010.

* cited by examiner

*Primary Examiner* — Nathaniel Wiehe
*Assistant Examiner* — Justin Seabe
(74) *Attorney, Agent, or Firm* — Dority & Manning, P.A.

(57) ABSTRACT

A system for detecting loads in a wind turbine is disclosed. In one aspect, the system may generally include a shaft and first and second pillow blocks receiving portions of the shaft. The second pillow block may be spaced axially apart from the first pillow block. Additionally, the system may include at least one sensor configured to indirectly detect loads transmitted through at least one of the first pillow block and the second pillow block.

17 Claims, 5 Drawing Sheets

FIG. -5-

SYSTEM AND METHOD FOR DETECTING AND/OR CONTROLLING LOADS IN A WIND TURBINE

FIELD OF THE INVENTION

The present subject matter relates generally to wind turbines and, more particularly, to a system and method for detecting and/or controlling loads in a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, each rotor blade is subject to deflection and/or twisting due to the aerodynamic wind loads acting on the blade, which results in reaction loads transmitted through blade root and into the hub of the wind turbine. As these loads are transmitted through the hub, they often result in bending and twisting of the main rotor shaft of the wind turbine, which can lead to deflections and/or distortions of the pillow blocks supporting the rotor shaft and/or deflections and/or distortions of the bedplate supporting the rotor shaft. Thus, when the loads transmitted through the hub are significantly high, substantial damage may occur to the rotor shaft, pillow blocks, bedplate and/or various other component of the wind turbine.

Accordingly, a system and method for detecting and/or controlling the loads transmitted through the hub and into the rotor shaft would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is direct to a system for detecting loads in a wind turbine. The system may generally include a shaft and first and second pillow blocks receiving portions of the shaft. The second pillow block may be spaced axially apart from the first pillow block. Additionally, the system may include at least one sensor configured to indirectly detect loads transmitted through at least one of the first pillow block and the second pillow block.

In one aspect, the present subject matter is direct to a system for detecting loads in a wind turbine. The system may generally include a shaft and first and second pillow blocks receiving portions of the shaft. The second pillow block may be spaced axially apart from the first pillow block. Additionally, the system may include at least one magnetic sensor mounted to at least one of the first pillow block and the second pillow block. The magnetic sensor may be configured to detect loads transmitted through at least one of the first pillow block and the second pillow block.

In a further aspect, the present subject matter is direct to a method for detecting loads in a wind turbine. The method may generally include receiving with a controller a signal associated with a load transmitted through at least one of a first pillow block and a second pillow block of the wind turbine and controlling an operational parameter of the wind turbine based on the load transmitted through the first pillow block and/or the second pillow block These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for detecting and/or controlling loads in a wind turbine. In particular, in several embodiments, the system may be configured to directly or indirectly detect loads transmitted through the pillow blocks of the wind turbine. For instance, in one embodiment, one or more sensors may be utilized to detect loads transmitted through one or more cross-members extending between the pillow blocks as the pillow blocks are deformed or otherwise displaced relative to one another due to loading. In another embodiment, one or more sensors may be mounted directly to one or both of the pillow blocks to permit the relative displacement between the pillow blocks and/or the loads transmitted through the pillow blocks to be measured. In addition or as an alternative thereto, the system may also be configured to directly or indirectly detect loads transmitted through the bedplate of the wind turbine. For example, in one embodiment, one or more sensors may be mounted directly to the bedplate to permit loads transmitted through the bedplate to be detected. In another embodiment, one or more sensors may be mounted to a torque arm of the wind turbine to permit loads transmitted through the bedplate to be indirectly detected.

It should be appreciated that the signals output from the sensors may be transmitted to a suitable controller (e.g., the wind turbine controller) to allow the wind turbine to be controlled based on the load and/or relative deflection measurements provided by the sensors. For instance, the controller may be configured to adjust the pitch of one or more of the rotor blades and/or alter another operational parameter of the wind turbine in order to reduce loading on the wind turbine components based on the output from the sensors.

Figure 1:
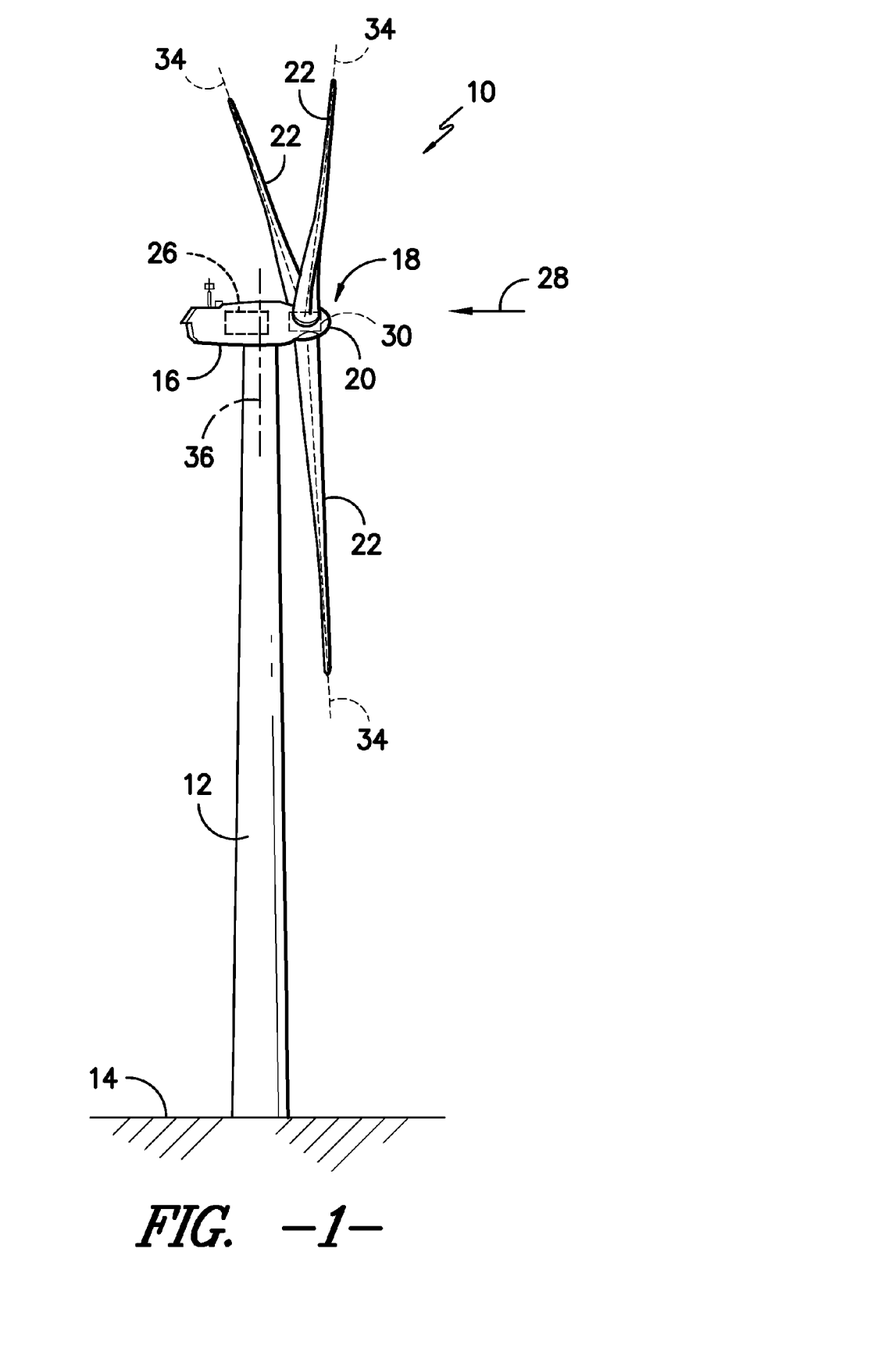
FIG. 1 illustrates a perspective view of one embodiment of a wind turbine.

Referring now to the drawings, FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to a pitch controller 30 of the wind turbine 10, which may be configured to control the operation of a plurality of pitch drives or pitch adjustment mechanisms 32 (FIG. 2) of the wind turbine. Specifically, the rotor blades 22 may be rotatably mounted to the hub 20 by one or more pitch bearing(s) (not illustrated) such that the pitch angle may be adjusted by rotating the rotor blades 22 along their pitch axes 34 using the pitch adjustment mechanisms 32. Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

It should be appreciated that the turbine controller 26 and/or the pitch controller 30 may generally comprise a computer or any other suitable processing unit. Thus, in several embodiments, the turbine controller 26 and/or pitch controller 30 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 and/or pitch controller 30 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the turbine controller 26 and/or pitch controller 30 to perform various computer-implemented functions. In addition, the turbine controller 26 and/or pitch controller 30 may also include various input/output channels for receiving inputs from sensors and/or other measurement devices and for sending control signals to various components of the wind turbine 10.

Figure 2:
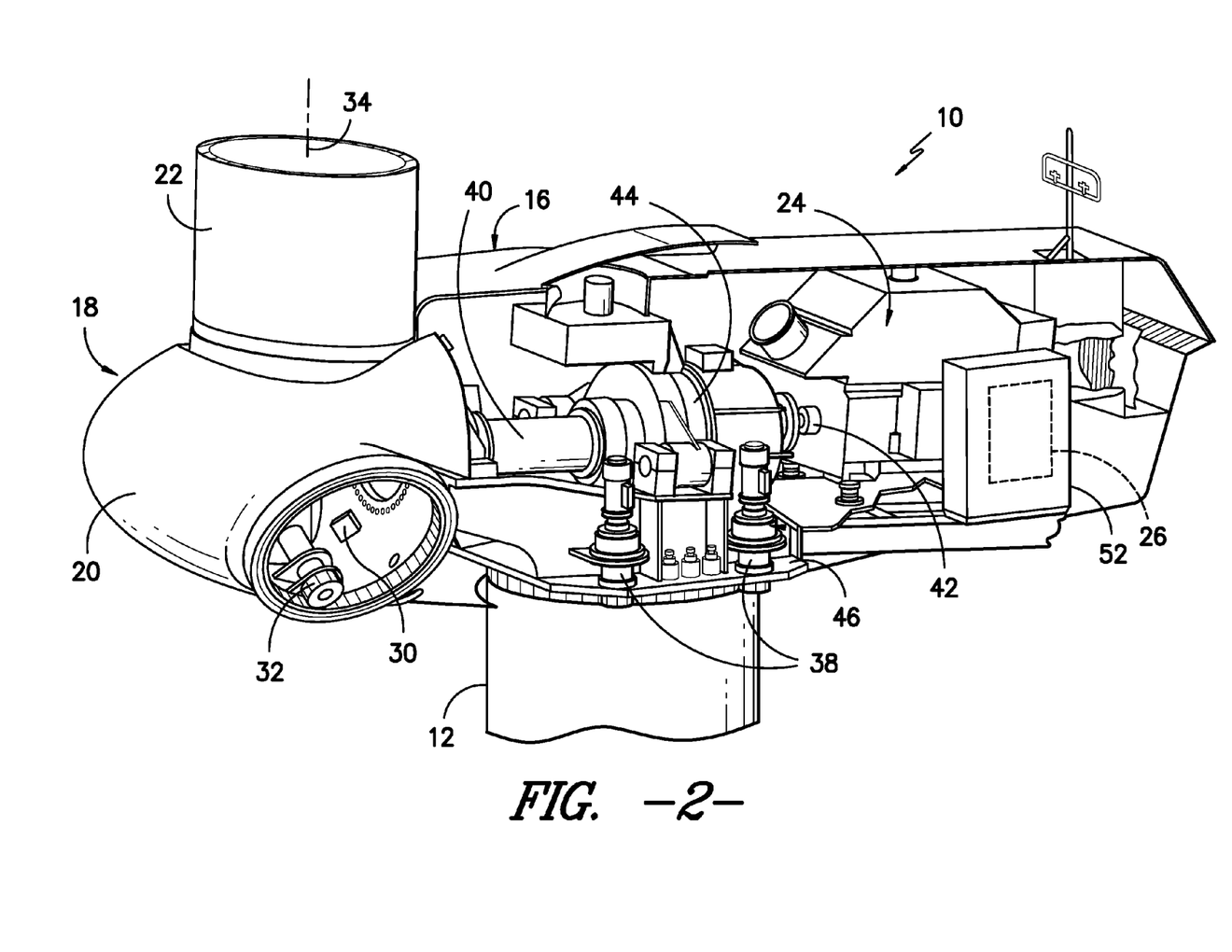
FIG. 2 illustrates a perspective, internal view of one embodiment of a nacelle of a wind turbine.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, as will be described below with reference to FIGS. 3 and 4, the rotor shaft 40 may be supported by the bedplate 46 via a pair of pillow blocks 48, 50 (FIGS. 3 and 4) mounted to the bedplate 46.

Additionally, as indicated above, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described above, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) through the pitch controller 30 for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

Figure 3:
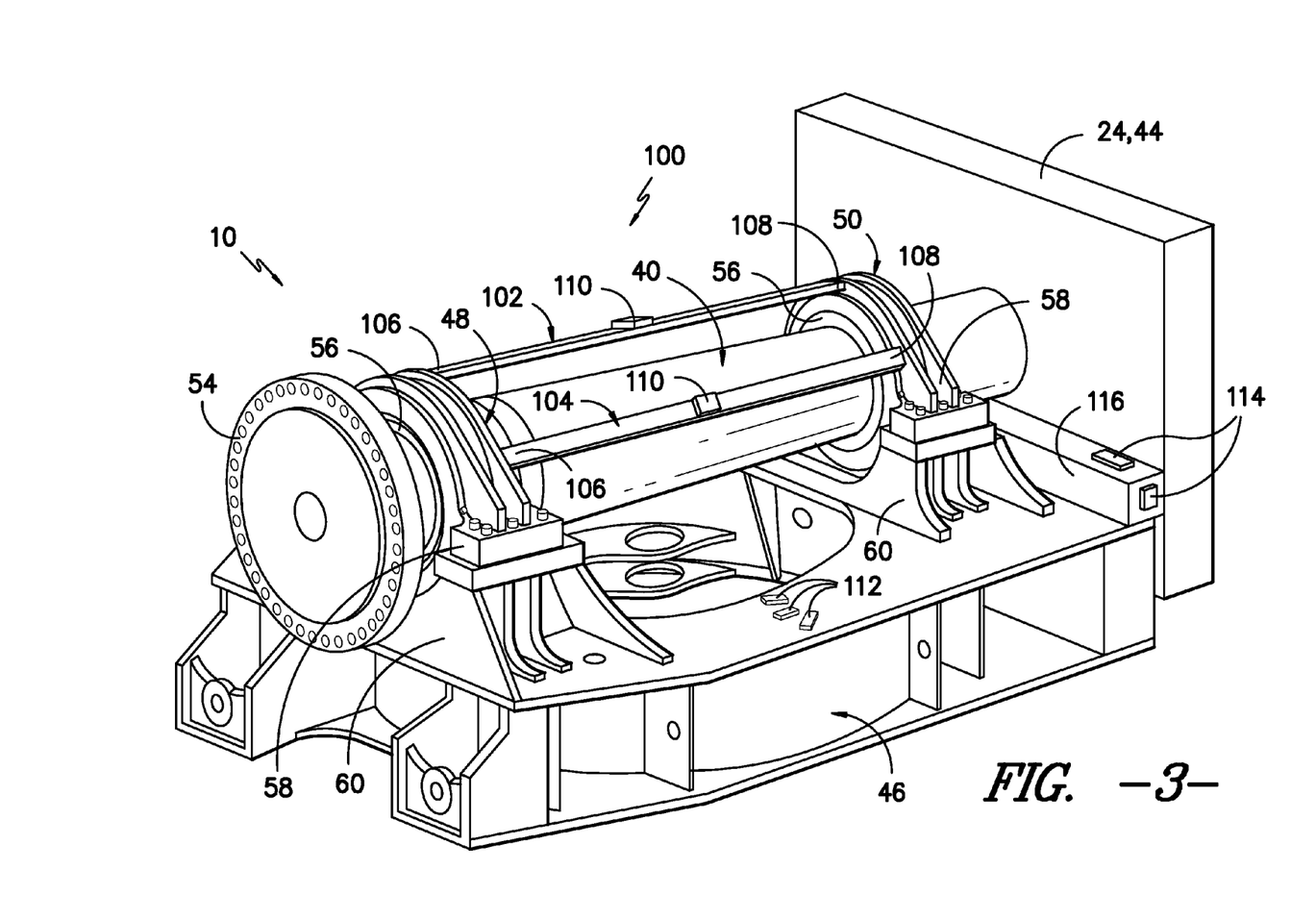
FIG. 3 illustrates a perspective view of one embodiment of a rotor shaft, pillow blocks and a bedplate of a wind turbine, particularly illustrating differing sensor locations that may be utilized with various embodiments of a system for detecting loads in the wind turbine.
Figure 4:
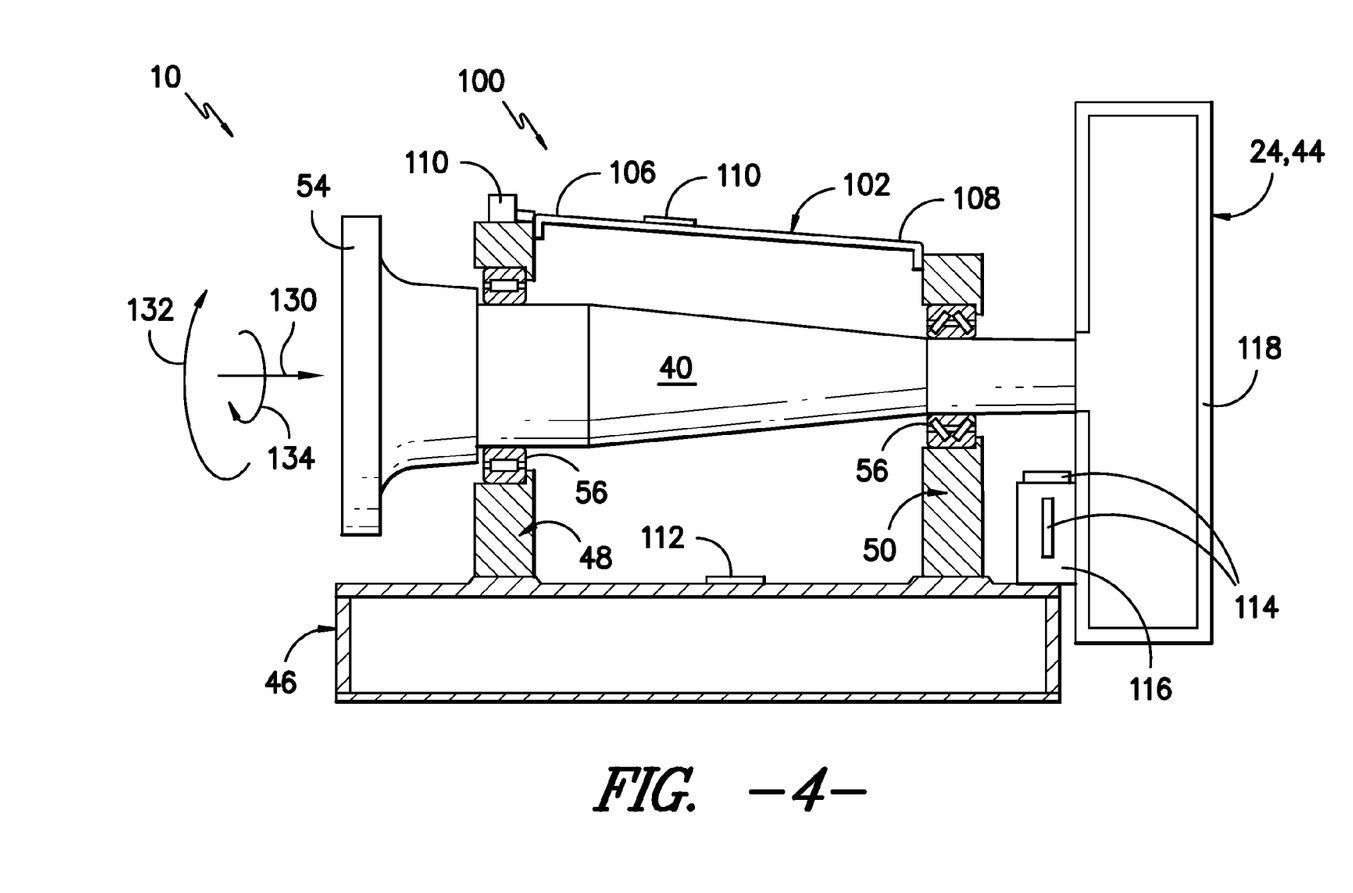
FIG. 4 illustrates a cross-sectional side view of the wind turbine and system components shown in FIG. 3.

Referring now to FIGS. 3 and 4, respective perspective and cross-sectional side views of one embodiment of the rotor shaft 40, the pillow blocks 48, 50 and the bedplate 46 of the wind turbine 10 described above are illustrated in accordance with aspects of the present subject matter. In particular, FIGS. 3 and 4 illustrate differing sensor locations that may be utilized with various embodiments of a system 100 for detecting loads transmitted through the rotor shaft 40, the pillow blocks 48, 50 and/or the bedplate 46 of the wind turbine 10.

As shown, the rotor shaft 40 may generally include a hub flange 54 for mounting the shaft 40 to the hub 20 of the wind turbine 10. Additionally, as indicated above, the rotor shaft 40 may be coupled to the generator 24 of the wind turbine 10, such as by coupling the rotor shaft 40 directly to the generator (e.g., in a direct drive configuration) or by coupling the rotor shaft 40 to the generator 24 through a gearbox 44. Thus, as shown in FIGS. 3 and 4, the rotor shaft 40 may generally extend axially from the hub flange 54 to one of the wind turbine generator 24 or the wind turbine gearbox 44.

The rotor shaft 40 may generally be supported by and coupled to the bedplate 46 through a pair of pillow blocks 48, 50 spaced apart axially along the shaft 40. Specifically, as shown in the illustrated embodiment, a forward or first pillow block 48 may be mounted to the bedplate 46 and may be configured to receive a portion of the rotor shaft 40. Additionally, an aft or second pillow block 50 may be mounted to the bedplate 46 and may also be configured to receive a portion of the rotor shaft 40. The pillow blocks may generally be configured as bearing housings for the rotor shaft 40 and, thus, may each include one or more bearings 56 (e.g., one or more locating bearings and/or floating bearings) for rotatably supporting the shaft 40 therein.

As shown in FIG. 3, in one embodiment, each pillow block 48, 50 may be configured as a two-piece construction, such as by including an upper block 58 and a lower block 60. In such an embodiment, the upper and lower blocks 58, 60 may generally be secured together using any suitable means (e.g., by using bolts or other suitable fastening mechanisms and/or by welding the halves together), with the lower block 60 of each pillow block 48, 50 being mounted to the bedplate 46. In other embodiments, each pillow block 48, 50 may be formed as a single, unitary component or may have any other suitable configuration known in the art.

It should be appreciated that the bedplate 46 may generally comprise any suitable support frame or other support structure that may be configured to support the rotor shaft 40 (via the pillow blocks 48, 50) atop the wind turbine tower 12. In addition, the bedplate 46 may also be configured to provide support for any other wind turbine components housed within the nacelle 16. For instance, in one embodiment, the wind turbine gearbox 44 and/or the generator 24 may be supported by the bedplate 36.

It should also be appreciated that the pillow blocks 48, 50 may be mounted to the bedplate 46 using any suitable attachment means and/or method known in the art. For instance, in several embodiments, the pillow blocks 48, 50 may be welded to the bedplate 46 and/or mounted to the bedplate 36 using bolts and/or any other suitable fastening mechanisms. In another embodiment, at least a portion of each pillow block 48, 50 may be formed integrally with the bed plate 46.

Referring still to FIGS. 3 and 4, as indicated above, the illustrated wind turbine may include a system 100 for detecting loads in the wind turbine 10, such as by detecting loads transmitted through the rotor shaft 40, the pillow blocks 48, 50 and/or the bedplate 46. Specifically, during operation of the wind turbine 10, aerodynamic loads acting on the rotor blades 22 typically causes bending and torque loads to applied through the wind turbine hub 20, which, in turn, result in loads being transmitted through the rotor shaft 40, the pillow blocks 48, 50 and/or the bedplate 46. These loads may result in bending and/or twisting of the rotor shaft 40, deflections and/or distortions of the pillow blocks 48, 50 and/or deflections and/or distortions of the bedplate 46. As will be described below, the disclosed system 100 may provide a means to accurately detect and control such loads in order to reduce loading on the various components of the wind turbine 10 and/or to ensure enhanced performance of the wind turbine 10.

In several embodiments, the disclosed system 100 may include one or more cross-members 102, 104 extending between the first and second pillow blocks 48, 50. For instance, as shown in the illustrated embodiment, the system 100 includes a first cross-member 102 and a second cross-member 102 extending between the pillow blocks 48, 50, with the cross-members 102, 105 being spaced apart circumferentially from one another. Specifically, as shown in FIG. 3, the cross-members 102, 104 are mounted around the rotor shaft 40 so as to be spaced apart circumferentially approximately 90 degrees. However, in other embodiments, the cross-members 102 104 may have any other suitable circumferential spacing, such as by being spaced apart around the rotor shaft 40 less than 90 degrees or greater than 90 degrees.

It should be appreciated that, in alternative embodiments, the disclosed system 100 may include more or less than two cross-members 102, 104. For instance, in several embodiments, a plurality of cross-members 102, 104 (e.g., three or more cross-members) may extend between the pillow blocks 48, 50, with such cross-members 102, 104 having any suitable circumferential spacing relative to the rotor shaft 40. Alternatively, a single cross-member 102, 104 may be installed between the pillow blocks 48, 50.

As particularly shown in FIG. 4, each cross-member 102, 104 may generally extending lengthwise or axially between a first end 106 coupled to the first pillow block 48 and a second end 108 coupled to the second pillow block 50. It should be appreciated that the ends 106, 108 of each cross-member 102, 104 may generally be configured to be coupled to the pillow blocks 48, 50 using any suitable attachment means and/or method known in the art. For instance, in several embodiments, the ends 106, 108 of each cross-member 102, 104 may be welded to the pillow blocks 48, 50 and/or attached to the pillow blocks 48, 50 using bolts and/or any other suitable fastening mechanisms.

Additionally, it should be appreciated that each cross-member 102, 104 may generally comprise any suitable elongated member that may be coupled between the pillow blocks 48, 50. For instance, in several embodiments, each cross-member 102, 104 may be configured as a beam (e.g., an "L" beam or an "I beam") and/or any other suitable connecting member. Additionally, in one embodiment, each cross-member 102, 104 may be rigid or semi-rigid, such as by being formed from a suitable rigid or semi-rigid material. Alternatively, each cross-member 102, 104 may be configured to be relatively flexible and may be formed from a suitable flexible material.

By coupling each cross-member 102, 104 between the pillow blocks 48, 50 as shown in the illustrated embodiment, loads transmitted through the pillow blocks 48, 50 and/or loads caused by the relative displacement of the pillow blocks 48, 50 may be transmitted into and through each cross-member 102, 104. For instance, as the pillow blocks 48, 50 are displaced relative to one another (e.g., axially displaced and/or circumferentially displaced relative to one another) due to loading on the wind turbine 10, each cross-member 102, 104 may be compressed, stretched and/or twisted. Thus, in several embodiments of the present subject matter, one or more sensors 110 may be associated with each of the cross-members 102, 104, such as by being mounted to a portion of each cross-member 102, 104 or by other being disposed at and/or adjacent to each cross-member 102, 104, so as to permit the loads transmitted through the pillow blocks 48, 50 to be indirectly detected. For instance, in one embodiment, the sensor(s) 110 may comprise one or more load sensors (e.g., one or more strain gauges, load cells and/or the like) mounted to each cross-member 102, 104, with the load sensor(s) being configured to detect strains, stresses and/or other loads transmitted through each cross-member 102, 104.

In another embodiment, the sensor(s) 110 may comprise one or more magnetic field sensors. As used herein, the term "magnetic field sensor" refers to any sensor that may be used to detect changes within a magnetic field, such as by detecting changes in the direction of a vector of the magnetic field and/or changes in how the magnetic field penetrates through materials. For instance, suitable magnetic field sensors may include magnetoresistive sensors, inductive pick-up coils, Hall sensors, flux gate sensors, magneto-impedance sensors, magneto-optical sensors and/or the like.

To utilize magnetic field sensor(s) to detect the loads transmitted through each cross-member 102, 104 and, thus, indirectly detect the loads transmitted through the pillow blocks 48, 50, it should be appreciated that all or a portion of each cross-member 102, 104 may need to be magnetized (e.g., by being directly magnetized or by being disposed within a magnetic field). Specifically, as is generally understood, the direction of a magnetic field vector created by a magnetized component and/or the way that a magnetic field passes through the material of a component changes as such component is subjected to loading (e.g., by being subject to tensile and/or compressive stresses, bending moments, torque and/or the like). Thus, by magnetizing all or a portion of each cross-member 102, 104 prior to or after installing such cross-member(s) 102, 104 between the pillow blocks 48, 50 and/or by positioning each cross-member 102, 104, within a magnetic field while such cross-member(s) 102, 104 are installed between the pillow blocks 48, 50, magnetic field sensors may be utilized to detect changes within the magnetic field caused by loads being transmitted through each cross-member 102, 104.

It should be appreciated that, in several embodiments, all or a portion of each cross-member 102, 104 may be magnetized using any suitable magnetization method known in the art. For instance, each cross-member 102, 104 may be magnetized by wrapping a suitable wire around a portion of the cross-member 102, 104 and by applying a strong current through the wire. Such a magnetization method may also include heating each cross-member 102, 104 to a temperature above its Curie point. Alternatively, separate leads of a suitable wire may be spaced apart along each cross-member 102, 104 and a pulsating current may be applied through the wire in order to magnetize the cross-members 102, 104.

In other embodiments, each cross-member 102, 104 may be magnetized by generating a magnetic field at and/or adjacent to the cross-members 102, 104 so that at least a portion of each cross-member 102, 104 is disposed within the magnetic field during operation of the wind turbine 10. For instance, a current carrying wire may be wrapped around, embedded within and/or disposed adjacent to a portion of each cross-member 102, 104 such that a magnetic field is generated that passes through the cross-members 102, 104.

It should be appreciated that, in embodiments in which the sensor(s) 110 comprises magnetic field sensor(s), the sensor(s) 110 may generally be disposed at any suitable location relative to each cross-member 102, 104 that permits such sensor(s) 110 to detect changes within the magnetic field caused by loads being transmitted through each cross-member 102, 104. For instance, in one embodiment, the sensor(s) 110 may be mounted directly to a portion of each cross-member 102, 104, such as by being mounted directly to the portion of each cross-member 102, 104 that has been magnetized. In other embodiments, the sensor(s) 110 may be mounted adjacent to each cross-member 102, 104 at any suitable location at which changes in the magnetic field may be detected.

In another embodiment, the sensor(s) 110 may comprise one or more magnetic susceptometers. As is generally understood, magnetic susceptometers may be utilized to detect changes in the material susceptibility of a component due to magnetization. Accordingly, in such embodiments, each cross-member 102, 104 need not be magnetized to permit the sensor(s) 110 to detect loads transmitted through the cross-member(s) 102, 104.

In further embodiments, the sensor(s) 110 may comprise one or more ultrasound sensors (e.g., one or more ultrasonic probes) mounted to and/or disposed adjacent to each cross-member 102, 104 (e.g., by being mounted to one of the pillow blocks 48, 50). In such embodiments, the ultrasound sensor(s) may be configured to detect stress, strains and/or other loads transmitted through each cross-member 102, 104 by transmitting sound waves through each cross-member 102, 104 and by detecting how such sound waves travel through each cross-member 102, 104. For instance, as is generally understood, when a material undergoes mechanical loading, the stresses within the material alter the velocity of any sound waves traveling through the material. Accordingly, by transmitting sound waves through each cross-member 102, 104 and detecting changes in the velocity of the sound waves, the ultrasound sensors may be configured to detect loads being transmitted through each cross-member 102, 104.

It should be appreciated that, in alternative embodiments, the sensor(s) 110 may comprise any other suitable sensors known in the art that may be capable of detecting loads transmitted through the each cross-member 102, 104.

Referring still to FIGS. 3 and 4, in addition to the sensor(s) 110 described above or as an alternative thereto, the disclosed system 100 may also include one or more sensors 112 for directly detecting loads transmitted through the bedplate 46 of the wind turbine 10. For instance, in several embodiments, the sensor(s) 112 may comprise one or more load sensors, such as strain gauges, load cells and/or the like, mounted directly to the bedplate 46. Specifically, as shown in FIG. 3, in one embodiment, a plurality of loads sensors (e.g., strain gauges) may be mounted to the bedplate 46 to permit loads transmitted through the bedplate 46 to be detected. In such an embodiment, it may be desirable for the sensors 112 to be grouped or clustered together on the bedplate 46. For instance, as shown in FIG. 3, the sensors 112 may be disposed proximate to one another and may be oriented at an angle relative to one another so that the sensors 112 detect loads transmitted through a particular portion of the bedplate 46 in differing directions (e.g., each sensor 112 may detect loads in one of the three orthogonal directions). Such sensor groupings (e.g., a strain gauge rosette) may provide very accurate measurements of the loads transmitted through the bedplate 46.

In other embodiments, it should be appreciated that the sensor(s) 112 may comprise any other suitable sensors known in the art that may be configured to detect loads transmitted through the bedplate 46. For example, the sensor(s) 112 may comprise one or more ultrasound sensors, one or more magnetic sensors and/or the like. It should also be appreciated that the disclosed system 100 need not include a plurality of grouped sensors 112 as shown in FIG. 4. For instance, in alternative embodiments, the sensors 112 may be spaced apart from one another along the bedplate 46 or the disclosed system 100 may only include a single sensor 112 mounted to the bedplate 46.

In addition to the sensor(s) 110, 112 described above or as an alternative thereto, the disclosed system 100 may also include one or more sensors 114 for indirectly detecting the loads transmitted through the bedplate 46, such as by detecting the loads transmitted through a torque arm 116 of the wind turbine 10. As is generally understood, torque arms 116 may be utilized to maintain the stationary portion 118 of a wind turbine gearbox 44 and/or generator 24 fixed in position relative to the bedplate 46. For instance, as shown in FIG. 4, in one embodiment, a torque arm 116 may be mounted between the bed plate 46 and a stationary portion 118 of the wind turbine gearbox 44 (e.g., the gearbox casing) or between the bed plate 46 and a stationary portion 118 of the generator 24 (e.g., the generator stator) in order to couple the gearbox 44 or generator 24 to the bed plate 46. In such an embodiment, one or more sensors 114 may be mounted to the torque arm 116 to detect loads transmitted through the torque arm 116 and, thus, indirectly detect the loads transmitted through the bedplate 46. For instance, in one embodiment, the sensor(s) 114 may comprise one or more loads sensors, such as strain gauges, load cells and/or the like, mounted to the torque arm 116. In other embodiments, the sensor(s) 114 may comprise one or more ultrasound sensors, one or more magnetic sensors and/ or any other suitable sensors known in the art.

It should be appreciated that, in addition to permitting the loads transmitted through the bedplate 46 to be indirectly detected, the sensors 114 associated with the torque arm 116 may also allow for the detection of loads transmitted from and/or through other components of the wind turbine 10. For example, the sensors 114 may permit loads transmitted from and/or through the rotor shaft 40, the generator 24 and/or the gearbox 44 to be detected.

Figure 5:
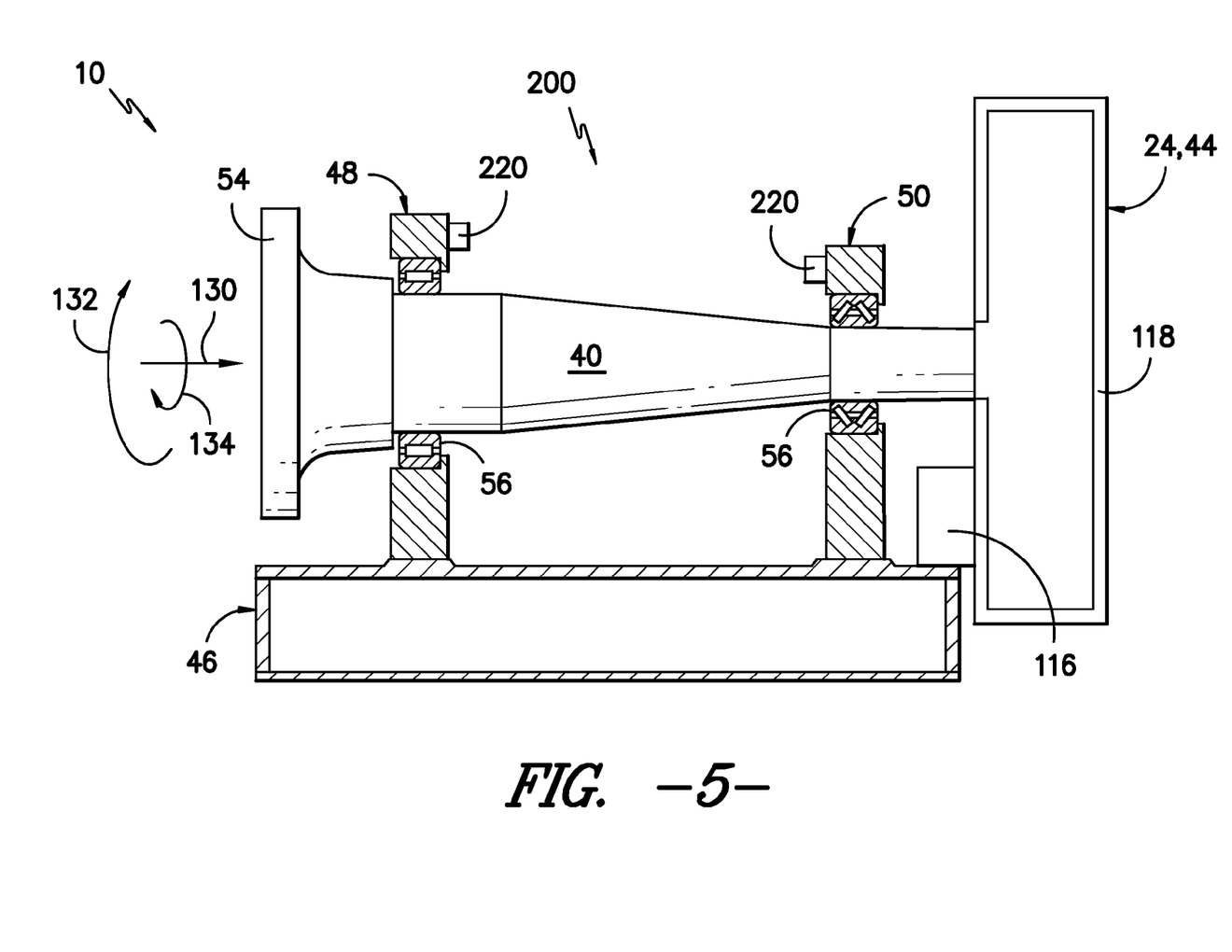
FIG. 5 illustrates the cross-sectional side view shown in FIG. 4, particularly illustrating another embodiment of a system for detecting loads in a wind turbine.

Referring now to FIG. 5, the cross-sectional side view of the rotor shaft 40, pillow blocks 48, 50 and bedplate 46 shown in FIG. 4 is illustrated having another embodiment of a system 200 for detecting loads in a wind turbine. As shown in FIG. 5, the system 200 may include one or more sensors 220 mounted to one or more of the pillow blocks 48, 50 of the wind turbine 10. As indicated above, due to the loads transmitted through the pillow blocks 48, 50, the pillow blocks 48, 50 may deflect axially relative to one another and/or circumferentially relative to one another. Thus, in several embodiments, the sensor(s) 220 may be configured to detect the relative displacement between the pillow block 48, 50, thereby permitting the loads transmitted through the pillow blocks 48, 50 to be indirectly detected. Alternatively, the sensor(s) 220 may be configured to directly detect the loads transmitted through the pillow blocks.

For instance, in one embodiment, the sensor(s) 220 may comprise one or more optical sensors mounted to one or both of the pillow blocks 48, 50. Suitable optical sensors may include, but are not limited to, proximity sensors, laser sensors, infrared sensors, cameras, other vision sensors and/or the like. In one embodiment, each optical sensor may include a transmitter for transmitting light waves from one of the pillow blocks 48, 50 towards the opposing pillow block 48, 50 and a receiver for detecting the light waves bouncing and/or reflecting off of the opposing pillow block 48, 50. Additionally, in one embodiment, a reflector (not shown) may be mounted to the opposing pillow block 48, 50 to improve reflection of the light waves off of such pillow block 48, 50. By continuously detecting the light waves bouncing and/or reflecting off of one or both of the pillow blocks 48, 50, any changes in the detected lights waves may be attributed to relative displacement between the pillow blocks 48, 50.

In other embodiments, the sensor(s) 220 may comprise one or more radar sensors mounted to one or both of the pillow blocks 48, 50. Suitable radar sensors may generally include any suitable object detection sensors that utilize electromagnetic waves to determine the distance and/or position of an object relative to the sensor. For instance, in one embodiment, each radar sensor may include a transmitter for transmitting radio waves from one of the pillow blocks 48, 50 towards the opposing pillow block 48, 50 and a receiver for detecting changes in the radio waves bouncing and/or reflecting off of the opposing pillow block 48, 50. Additionally, in one embodiment, a reflector (not shown) may be mounted to the opposing pillow block 48, 50 to improve reflection of the radio waves off of such pillow block 48, 50. By continuously detecting the radio waves bouncing and/or reflecting off of one or both of the pillow blocks 48, 50, any changes in the detected radio waves may be attributed to relative displacement of the pillow blocks 48, 50.

In further embodiments, the sensor(s) 220 may comprise one or more accelerometers mounted to each of the pillow blocks 48, 50. For instance, a first accelerometer may be mounted to the first pillow block 48 and a second accelerometer may be mounted to the second pillow block 50. Each accelerometer may generally be configured to measure the acceleration of one of the pillow blocks 48, 50, which may then be utilized to determine the displacement of such pillow block 48, 50. Accordingly, by comparing the displacement of the first pillow block 48 to the displacement of the second pillow block 50, the relative displacement of the pillow blocks 48, 50 may be determined.

In even further embodiments, the sensors(s) 220 may comprise one or more magnetic sensors, such as one or more magnetic field sensors and/or one or more magnetic susceptometers mounted to each of the pillow blocks 48, 50. For instance, a first magnetic field sensor may be mounted to the first pillow block 48 and a second magnetic field sensor may be mounted to the second pillow block 50. In such an embodiment, at least a portion of the first and second pillow blocks 48, 50 may be magnetized (e.g., by using any of the magnetization methods described above) so that the magnetic field sensors may be utilized to directly detect loads transmitted through the pillow blocks 48, 50 based on changes in the magnetic fields generated by and/or passing through the pillow blocks 48, 50. Alternatively, a first magnetic susceptometer may be mounted to the first pillow block 48 and a second magnetic susceptometer may be mounted to the second pillow block 50 to permit loads between the pillow blocks 48, 50 to be directly determined.

It should be appreciated that the sensors 220 described above with reference to FIG. 5 may be utilized in addition to or as an alternative to the sensors 110, 112, 114 described above with reference to FIGS. 3 and 4. Specifically, the disclosed system 100, 200 may include any combination of sensors 110, 112, 114, 220 that permits loads within the wind turbine 10 to be detected.

It should also be appreciated that each of the sensors 110, 112, 114, 220 described above with reference to FIGS. 3-5 may be configured to transmit measurement signals (associated with the loads transmitted through the cross-members 102, 104, the pillow blocks 48, 50, the torque arm 116 and/or the bedplate 46 and/or the relative displacement between the pillow blocks 48, 50) to a suitable controller, such as the turbine controller 26 and/or the pitch controller 30 of the wind turbine 10 (FIGS. 1 and 2). Thus, in several embodiments, each sensor 110, 112, 114, 220 may be communicatively coupled to the controller 26, 30 via a wired and/or wireless connection. The signals transmitted by each sensor 110, 112, 114, 220 may then be received by the controller 26, 30 and subsequently processed and/or analyzed. For instance, the controller 26, 30 may be provided with suitable software instructions that, when implemented, configure the controller 26, 30 to determine the loads transmitted through each cross-member 102, 104 based on the measurement signals provided by the sensor(s) 110, the loads transmitted through the bedplate 46 based on the measurement signals provided by the sensor(s) 112, the loads transmitted through the torque arm 116 based on the measurement signals provided by the sensor(s) 114 and/or the relative displacement between the pillow blocks 48, 50 based on the measurement signals provided by the sensor(s) 220. The controller 26, 30 may then be configured to process and/or analyze such data in order to estimate and/or determine the loads transmitted through the pillow blocks 48, 50 and/or the bedplate 46, as well as the loads transmitted into the rotor shaft 40 from the hub 20, such as the axial thrust loads 130, bending moments 132 and/or torque loads 134 (FIGS. 4 and 5) transmitted into the shaft 40.

Upon determining the loads transmitted through and/or the relative displacement between such components, the controller 26, 30 may be configured to control an operational parameter of the wind turbine 10, if necessary, in order to reduce or otherwise control the loads being transmitted through the hub 20. For instance, in several embodiments, the controller 26, 30 may be configured to control the pitch angle of one or more of the rotor blades 22, such as by altering the pitch angle of one or more of the rotor blades 22 for a full or partial revolution of the blade(s) 22, to permit the loads acting on the rotor blade 22 to be reduced or otherwise controlled. In other embodiments, the controller 26, 30 may be configured to control any other suitable operational parameter of the wind turbine 10 so as to reduce or otherwise control the loads being transmitted through the hub 20. For instance, the controller 26, 30 may be configured to increase or decrease the torque demand on the wind turbine generator 24, reduce the rotational speed of the rotor blades 22 (e.g., by applying a brake), yaw the nacelle 16 about the yaw axis 36 in order to change the orientation of the nacelle 16 relative to the direction 28 of the wind and/or the like.

It should be appreciated that the present subject matter is also directed to a method for controlling loads in a wind turbine 10. For example, in several embodiments, the method may include receiving with a controller 26, 30 a signal associated with a load transmitted through at least one of a first pillow block 48 and a second pillow block 50 of the wind turbine 10 and controlling an operational parameter of the wind turbine 10 based on the load transmitted through the first pillow block 48 and/or the second pillow block 50. For instance, as described above, the sensors 110, 220 may be configured to directly or indirectly measure the loads transmitted through the pillow blocks 48, 50 and transmit such measurements to one or more of the controllers 26, 30 of the wind turbine 10. The controller(s) 26, 30 may then be configured to adjust one or more operational parameters of the wind turbine 10 (e.g., by pitching the blades 22) in order to reduce or otherwise control the loads.

In other embodiments, the method may include receiving with a controller 26, 30 a signal associated with a load transmitted through a bedplate 46 of the wind turbine 10 and controlling an operational parameter of the wind turbine 10 based on the load transmitted through the bedplate 46. For example, as described above, the sensors 112, 114 may be configured to directly or indirectly measure the loads transmitted through the bedplate 46 and transmit such measurements to one or more of the controllers 26, 30 of the wind turbine 10. The controller(s) 26, 30 may then be configured to adjust one or more operational parameters of the wind turbine 10 (e.g., by pitching the blades 22) in order to reduce or otherwise control the loads.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting loads in a wind turbine, the system comprising:
   a shaft;
   a first pillow block receiving a portion of the shaft;
   a second pillow block receiving a portion of the shaft, the second pillow block being spaced axially apart from the first pillow block; and,
   at least one sensor mounted to at least one of the first pillow block or the second pillow block, the at least one sensor being configured to detect relative displacement between the first and second pillow blocks.

2. The system of claim 1, wherein the at least one sensor comprises a first accelerometer mounted to the first pillow block and a second accelerometer mounted to the second pillow block.

3. The system of claim 1, wherein the at least one sensor comprises an optical sensor mounted to at least one of the first pillow block or the second pillow block.

4. The system of claim 1, wherein the at least one sensor comprises a radar sensor mounted to at least one of the first pillow block or the second pillow block.

5. The system of claim 1, further comprising a controller communicatively coupled to the at least one sensor, the controller being configured to adjust an operational parameter of the wind turbine based on signals received from the at least one sensor.

6. A system for detecting loads in a wind turbine, the system comprising:
   a shaft;
   a first pillow block receiving a portion of the shaft;
   a second pillow block receiving a portion of the shaft, the second pillow block being spaced axially apart from the first pillow block; and
   at least one magnetic sensor mounted to at least one of the first pillow block and the second pillow block, the at least one magnetic sensor being configured to directly detect loads transmitted through at least one of the first pillow block or the second pillow block.

7. The system of claim 6, wherein the at least one magnetic sensor comprises a first magnetic field sensor mounted to the first pillow block and a second magnetic field sensor mounted to the second pillow block.

8. The system of claim 6, wherein the at least one magnetic sensor comprises a first magnetic susceptometer mounted to the first pillow block and a second magnetic susceptometer mounted to the second pillow block.

9. The system of claim 6, further comprising a controller communicatively coupled to the at least one magnetic sensor, the controller being configured to adjust an operational parameter of the wind turbine based on signals received from the at least one magnetic sensor.

10. A method for controlling loads in a wind turbine, the method comprising:
    receiving with a controller a signal from at least one sensor configured to detect loads transmitted through a cross-member extending between a first pillow block and a second pillow block of the wind turbine or from at least one sensor configured to detect relative displacement between the first and second pillow blocks, the signal being associated with a load transmitted through at least one of the first pillow block or the second pillow block; and
    controlling an operational parameter of the wind turbine based on the load transmitted through the at least one of the first pillow block or the second pillow block.

11. The method of claim 10, wherein controlling an operational parameter of the wind turbine based on the load transmitted through the at least one of the first pillow block and the second pillow block comprises adjusting a pitch angle of the rotor blade using a pitch adjustment mechanism of the wind turbine.

12. A system for detecting loads in a wind turbine, the system comprising:
    a shaft;
    a first pillow block receiving a portion of the shaft;
    a second pillow block receiving a portion of the shaft, the second pillow block being spaced axially apart from the first pillow block;
    at least one sensor configured to indirectly detect loads transmitted through at least one of the first pillow block or the second pillow block; and
    a cross-member extending between a first end and a second end, the first end being coupled to the first pillow block and the second end being coupled to the second pillow block.

13. The system of claim 12, wherein the at least one sensor is configured to detect loads transmitted through the cross-member.

14. The system of claim 13, wherein the at least one sensor is mounted to a portion of the cross-member, the at least one sensor comprising at least one of a load sensor, a magnetic field sensor and a magnetic susceptometer.

15. The system of claim 13, wherein the at least one sensor is mounted to or disposed adjacent to a portion of the cross-member, the at least one sensor comprising an ultrasound sensor.

16. The system of claim 13, wherein the cross-member comprises a first cross-member and the at least one sensor comprises a first sensor, further comprising a second cross-member spaced apart circumferentially from the first cross-member and a second sensor configured to detect loads transmitted through the second cross-member.

17. The system of claim 6, wherein a portion of at least one of the first pillow block or the second pillow block is magnetized.

* * * * *